United States Patent
Breuer et al.

(10) Patent No.: US 10,194,343 B2
(45) Date of Patent: Jan. 29, 2019

(54) METHOD FOR OPERATING A WIRELESS DEVICE SUPPORTING SELF ORGANIZING NETWORKS

(71) Applicant: GEMALTO M2M GMBH, Munich (DE)

(72) Inventors: Volker Breuer, Boetzow (DE); Thomas Ulrich, Bad Dürkheim (DE); Lars Wehmeier, Falkensee (DE)

(73) Assignee: GEMALTO M2M GMBH, Munich (DE)

( * ) Notice: Subject to any disclaimer, the term of this patent is extended or adjusted under 35 U.S.C. 154(b) by 0 days.

(21) Appl. No.: 15/560,938

(22) PCT Filed: Mar. 22, 2016

(86) PCT No.: PCT/EP2016/056270
§ 371 (c)(1),
(2) Date: Sep. 22, 2017

(87) PCT Pub. No.: WO2016/150969
PCT Pub. Date: Sep. 29, 2016

(65) Prior Publication Data
US 2018/0084449 A1 Mar. 22, 2018

(30) Foreign Application Priority Data
Mar. 23, 2015 (EP) .................................... 15160325

(51) Int. Cl.
*H04W 4/00* (2018.01)
*H04W 24/10* (2009.01)
(Continued)

(52) U.S. Cl.
CPC ............ *H04W 24/10* (2013.01); *H04W 4/70* (2018.02); *H04W 36/08* (2013.01); *H04W 36/30* (2013.01); *H04W 36/36* (2013.01); *H04W 84/18* (2013.01)

(58) Field of Classification Search
CPC ....... H04W 24/10; H04W 4/70; H04W 4/005; H04W 36/08; H04W 36/30; H04W 36/36; H04W 84/18
(Continued)

(56) References Cited

U.S. PATENT DOCUMENTS 8,320,918 B2 * 11/2012 Lee ...................... H04W 36/32
455/435.1
8,892,095 B2 * 11/2014 Wehmeier ......... H04W 36/0083
455/432.2
(Continued)

FOREIGN PATENT DOCUMENTS

EP 2 521 397 A1 11/2012
EP 2 677 797 A1 12/2013
(Continued)

OTHER PUBLICATIONS

International Search Report (PCT/ISA/210) dated May 9, 2016, by the European Patent Office as the International Searching Authority for International Application No. PCT/EP2016/056270.
(Continued)

*Primary Examiner* — Marceau Milord
(74) *Attorney, Agent, or Firm* — Buchanan Ingersoll & Rooney PC (57) ABSTRACT

A method for operating a low-mobility wireless device in a cellular network, wherein the low-mobility wireless device operates with an active base node, and the low-mobility wireless device operates in a first mode, in which measurements of transmissions of base nodes are diminished. When
(Continued)

the cellular network is enhanced by a new base node, the active base node transmits a first indication at least to the low-mobility wireless device. The low-mobility wireless device, in response to the reception of the first indication, switches to a second mode of operation, comprising execution of at least one measurement of transmissions of base nodes, and transmits at least one measurement report to the then-active base node. The active base node, upon reception of a measurement report, updates neighbour relation data relating to the base node identified by a base node reference with information obtained from the received measurement report.

17 Claims, 4 Drawing Sheets

(51) Int. Cl.
| | |
|---|---|
| H04W 4/70 | (2018.01) |
| H04W 36/08 | (2009.01) |
| H04W 36/30 | (2009.01) |
| H04W 36/36 | (2009.01) |
| H04W 84/18 | (2009.01) |

(58) Field of Classification Search
USPC .................................... 455/422.1, 434, 437
See application file for complete search history.

(56) References Cited

U.S. PATENT DOCUMENTS

| | | | | |
|---|---|---|---|---|
| 8,897,819 B2* | 11/2014 | Arvidsson | ............ | H04W 68/04 455/422.1 |
| 8,938,266 B1* | 1/2015 | Goyal | ............ | H04W 68/06 455/458 |
| 8,977,301 B2* | 3/2015 | Poyhonen | ............ | H04W 68/02 370/328 |
| 9,107,047 B1* | 8/2015 | Malreddy | ............ | H04W 4/06 |
| 9,313,704 B2* | 4/2016 | Shi | ............ | H04W 24/10 |
| 9,313,724 B2* | 4/2016 | Lee | ............ | H04W 48/16 |
| 9,769,710 B2* | 9/2017 | Lee | ............ | H04W 36/0016 |
| 9,781,651 B2* | 10/2017 | Shi | ............ | H04W 36/30 |
| 2006/0153133 A1* | 7/2006 | Zhong | ............ | H04W 36/0061 370/331 |
| 2008/0102835 A1* | 5/2008 | Zhao | ............ | H04W 36/32 455/436 |
| 2008/0108353 A1* | 5/2008 | Lee | ............ | H04J 11/0093 455/437 |
| 2008/0119209 A1* | 5/2008 | Upp | ............ | H04W 68/02 455/458 |
| 2009/0239555 A1* | 9/2009 | Sim | ............ | H04W 4/08 455/458 |
| 2009/0264130 A1* | 10/2009 | Catovic | ............ | H04W 36/0083 455/436 |
| 2010/0029274 A1* | 2/2010 | Deshpande | ............ | H04J 11/0093 455/435.3 |
| 2010/0061354 A1* | 3/2010 | Maheshwari | ............ | H04W 68/02 370/338 |
| 2010/0124223 A1* | 5/2010 | Gibbs | ............ | H04W 28/06 370/389 |
| 2010/0173651 A1* | 7/2010 | Park | ............ | H04W 68/02 455/458 |
| 2010/0240368 A1* | 9/2010 | Fox | ............ | H04W 36/04 455/435.3 |
| 2011/0028181 A1* | 2/2011 | Byun | ............ | H04W 36/0083 455/525 |
| 2011/0130144 A1* | 6/2011 | Schein | ............ | H04L 41/12 455/442 |
| 2011/0319080 A1* | 12/2011 | Bienas | ............ | H04W 36/30 455/436 |
| 2012/0009918 A1* | 1/2012 | Wu | ............ | H04W 24/10 455/423 |
| 2012/0092998 A1* | 4/2012 | Chang | ............ | H04W 24/10 370/241 |
| 2012/0178451 A1 | 7/2012 | Kubota et al. | | |
| 2012/0202543 A1* | 8/2012 | Murias | ............ | H04W 4/70 455/509 |
| 2013/0155654 A1* | 6/2013 | Lin | ............ | G02F 1/133308 362/97.1 |
| 2013/0324119 A1* | 12/2013 | Shi | ............ | H04W 24/10 455/434 |
| 2013/0324131 A1* | 12/2013 | Shi | ............ | H04W 36/30 455/437 |
| 2014/0003259 A1 | 1/2014 | Chin et al. | | |
| 2014/0022995 A1* | 1/2014 | Park | ............ | H04W 68/02 370/328 |
| 2016/0374050 A1* | 12/2016 | Prasad | ............ | H04W 4/06 |

FOREIGN PATENT DOCUMENTS

| | | |
|---|---|---|
| EP | 2 677 807 A1 | 12/2013 |
| EP | 2 782 387 A1 | 9/2014 |

OTHER PUBLICATIONS

Written Opinion (PCT/ISA/237) dated May 9, 2016, by the European Patent Office as the International Searching Authority for International Application No. PCT/EP2016/056270.

* cited by examiner

METHOD FOR OPERATING A WIRELESS DEVICE SUPPORTING SELF ORGANIZING NETWORKS

FIELD OF THE INVENTION

The present invention relates to a method for operating a wireless device in a cellular network.

The invention also pertains to a device using said method. The invention further relates to a base node communicating with said device.

BACKGROUND OF THE INVENTION

Generally, in the field of cellular wireless communication it is known that base nodes of cellular networks require knowledge of other base nodes of the same cellular network nearby, in particular in order to conduct handover procedures for wireless devices operating in said cellular network.

Currently in such base nodes information about neighbouring base nodes is stored as neighbour relation data, in particular in neighbour relationship tables (NRT). This information is used to be provided by the network operator as part of the network planning tasks.

With cellular networks following the LTE standard a new concept was introduced (3GPP TS 32.500) which is called self-organizing networks (SON). This concept solves the problem of previous wireless technology standards that with a new base node installed in the field, the neighbour relationship tables of the new base node and the base nodes in the proximity needed to be updated, which causes remarkable effort for network planning. Instead, as part of the SON concept the wireless devices operating in the cellular network carry out measurements of transmissions from detectable base nodes and send measurement reports as part of the mobility management to the base nodes, where they are operating in. The same applies to the new base node once the first wireless devices decide to perform a reselection towards this new base node. The information provided with these measurement reports are used for updating the neighbour relationship tables.

However, In the context of machine-type communication (MTC) a plurality of devices are in use, which remain on a fixed position, e.g. installed as metering devices, vending machines, home security devices etc. For those so-called low-mobility devices it is known from EP 2 521 397 A1 that in order to reduce network signalling load and power consumption of the device, the technically unnecessary measurements and reporting of neighbour base nodes signalling strength measurements are strongly reduced, if not fully omitted.

On the other hand exactly the low-mobility devices with a known and reliable location are those, whose measurements reports as part of the self-organizing networks are the most favourable ones for the base nodes. This is due to the situation that changes of measurement results measured by a defined low-mobility device are not impacted by movement and therefore need to indicate a different reason for the changes, while constant measurement results are not accidentally constant but indicate real constant conditions. For measurements from moving wireless devices none of these conclusions can be made. Hence, those measurements are far more reliable for a base node than those of moving wireless devices.

It is therefore the goal of present invention to provide a solution which allows for a self-organizing network to receive measurement reports from wireless devices with low-mobility measurement behaviour.

Further alternative and advantageous solutions would, accordingly, be desirable in the art.

SUMMARY OF THE INVENTION

For this it is according to a first aspect of the invention suggested a method for operating a wireless device according to claim 1. It is further suggested according to a second aspect of the invention a wireless device according to claim 7. According to a third aspect of the invention it is suggested a base node according to claim 13.

It is therefore proposed according to the first aspect of the invention a method for operating a wireless device in a cellular network, the cellular network comprising a core network and a plurality of base nodes, each configured to maintain neighbour relation data, the cellular network further providing self organizing network capabilities, wherein the wireless device is operating with an active base node, which is the one of said base nodes the wireless device is currently camping on, and the wireless device is operating in a first mode, comprising that measurements of transmissions of base nodes are diminished, the method comprising the steps of, for the cellular network:

in case the cellular network is enhanced by a new base node, triggering the active base node to transmit a first indication at least to said wireless device,     for the wireless device, in response to the reception of the first indication, switching to a second mode of operation, comprising execution of at least one measurement of transmissions of base nodes, and     transmitting at least one measurement report to the by then active base node, the measurement report comprises results of said measurements and a base node reference of the measured base nodes,     for the active base node, upon reception of a measurement report, updating neighbour relation data relating to the base node identified by said base node reference with information obtained from the received measurement report.

The inventive method is dedicated for a wireless device which is configured to operate with a base node of a cellular network. The cellular network and the respective base nodes are configured to support the self organizing network technology which was introduced with the 4G resp. LTE standard. As part of the self organizing network technology, in particular neighbor relation data of each base node are getting automatically configured. Such neighbor relation data are preferably used for handovers of wireless devices between base nodes during open connection resp. IP contexts. As since introduction of LTE, base nodes—in particular eNodeBs—are capable for executing handovers directly between the eNodeBs via the so-called X2 interface, it is of high importance that each eNodeB has an accurate overview of the neighboring eNodeBs. When a new base node is installed in the field, it is possible that it has no knowledge at all e.g. about overlapping regions between other base nodes' cells, where a handover would be possible.

The concept of self-organizing network is based on wireless devices, in particular handsets, which regularly provide measurement reports to their active base node, which is the base node they are currently camping on. More information about the standardized self-organizing network technology are available in ETSI 3GPP TS 32.500 and Dahlen, Johannsson, Gunnarsson, Moe, Rimhagen, Kallin (2011): "Evaluations of LTE Automatic Neighbor Relations", IEEE VTC Spring 2011, pp. 1-5, May 2011, to which contents the reader is directed for understanding present inventive method.

However, the wireless device of the inventive method does not form a regular mobile handset, but is capable to be operated in a first mode. This first mode is characterized by the behaviour that measurements of transmissions of base nodes are diminished. This in particular means, that the wireless device executes only occasionally measurements of neighbour base nodes, in particular only when it plans to execute a data transmission or reception or when it detects a degradation of signals from the current active base node beyond a predefined threshold, like it is suggested in EP 2 521 397 A1, to which contents the reader is directed for understanding present inventive method.

A wireless device which can be operated in said first mode is in particular a low-mobility device. Such devices are those with expected low movement, in particular a fixed location. Due to that, generally no mobility functions need to be carried out, in particular out of power saving and/or signalling reduction. This is true as it can be expected as long as a suitable serving base node is found, and the wireless device is not moving, that the wireless device will most probably be served by this base node in the foreseeable future. Such wireless device is called low-mobility wireless device. Wireless devices not supporting the first mode of operation are so-called moving wireless devices. Preferably the low-mobility device is configured to detect a stable location and switch to the first mode, in particular the energy efficient mode. Alternatively this mode is activated manually or by the wireless device control appliance itself, once the wireless device is installed in the final position.

The inventive method generally starts with the enhancement of the cellular network by a new base node. This enhancement includes both the physical installation and activation of a new base node, and the activation of a base node which was already in place and operating for a certain period of time, but meanwhile out of operation. The latter is in particular appropriate for places where only occasional a high occupancy is to be expected, like in a stadium, fairground or at a race track.

When the new base node is activated as being operational in the cellular network, it is proposed to trigger the active base node to transmit a first indication to the wireless device. Actually this preferably happens when the new base node is situated in the proximity of the active base node. In particular the new base node can be assumed to be located in proximity of the active base node when it is situated in the same tracking area. Preferably in such case the cellular network triggers all base nodes located in the same tracking area as the new base node.

When the active base node gets aware of the triggering event, it preferably transmits the first indication to more than one wireless device, in particular all wireless devices currently camping on the active base node, at least all of the camping wireless devices supporting said first mode of operation, or all of the camping wireless devices who are currently operating in the first mode of operation.

The first indication is basically a message that is transmitted from the base node to the wireless device.

Preferably it is suggested that the first indication is part of a broadcast channel element transmitted from the triggered active base node to at least one wireless device. With that embodiment all wireless devices camping on the active base node are informed as long as they are capable of receiving the broadcast channel element. Preferably the first indication is part of the LTE-specific Master Information Block (MIB) or of the System Information Blocks (SIBs).

Once the wireless device receives said first indication, it activates the second mode of operation. The second mode of operation basically corresponds to the regular mode of operation for high-mobility devices, that is it comprised execution of at least one measurement of transmissions of base nodes. This is advantageous as it is expected that each envisaged wireless device is capable to support the second mode of operation.

With that mode the wireless device conducts measurement of transmissions of neighbouring base nodes, as far as they are still detectable. Generally the measurement of transmissions of the active base node is also conducted during this phase. The measurements are generally the basis for the measurement reports that are supposed to be transmitted with the next step.

In a preferred embodiment it is proposed for the wireless device the step of executing an operation resulting in one of the measured base nodes becoming the active base node, prior to transmitting the measurement report. As part of the second mode it is according to this embodiment foreseen that based on the executed measurement the wireless device is configured to decide with which base node the wireless device will continue operation as active base node. This operation is in particular known as reselection. Therefore in the case that one of the other base nodes provides better measurement results than the active base node, it is proposed to execute a reselection, which means that the wireless device changes from camping on a first base node to the base node with the best measurement results. The latter thus becomes the active base node.

This operation is in particular of relevance for the situation that the new base node, which activation triggered the described method steps, is positioned close to the wireless device. In this case the new base node becomes the active base node of the respective wireless device.

Consequently the next step of transmitting the measurement report from the wireless device to the active base node concerns the by then active base node, that is the wireless device now transmits the measurement report—should a reselection occur before—to the base node, where the wireless device changed to.

If no reselection has happened, then the measurement reports are transmitted to the original active base node.

Such measurement reports comprises results of said measurements of transmissions from base nodes, preferably those different from the by then active base node. Those measurements are accompanied with a base node reference indicating the base node, the measurements are applying to. Generally such base node reference encompasses one of different type of information which are suitable for identify a base node, at least within the tracking area. As such a cell identifier, a scrambling code or a frequency are appropriate base node references.

The measurements in particular comprise radio signal strength of the received signals from the base node.

When the active base node receives the at least one measurement report, it is preferably capable of updating the neighbour relation data stored with the base node. For that the received measurements and the corresponding base node referenced are used. An update of the neighbour relation data is in particular executed in case said measurement report comprises information concerning a referenced base node, for which entries are missing in the neighbour relation data.

As a result of executing this method, the active base node received information about neighbouring base nodes from the wireless device and is thus able to figure out, if a new base node is introduced in the tracking area of the cellular network, and if it is close enough for handover decisions towards this base node.

When the receiving base node is processing the received measurement reports, in particular already available neighbour relation information are updated with a confidence value, when the measurement is received from a low-mobility device. This confidence value is preferably taken into account when measurements of different types of wireless devices are received, which may lead to contradictory measurements. With the confidence value it is easier to sort out which measurement value to rely upon in such situations. The method is in particular advantageous as with such wireless devices supporting the first mode of operation, which means in particular low mobility devices, a comparison to earlier measurements of the same wireless device clearly indicates to a base node the change in the environmental situation with respect to neighbouring base nodes.

With that information in the neighbour relation tables an accurate and reliable handover handling is possible and the new base node gets fully integrated. Moreover, by the option to perform a reselection to the new base node, the new base node receives information about its neighbour nodes that were potentially not present at all initially.

According to another preferred embodiment it is suggested a method wherein the measurement report further comprises an element indicating a cause of the measurement report relating to the triggering of said measurement through said first indication.

According to this embodiment the wireless device is able to indicate to the base node, out of what reason the measurement report was transmitted. In particular in case of a reselection the receiving base node of the measurement report is different from the base node submitting the first indication.

This is advantageous for the receiving base node, hence it is possible for the base node to react accordingly.

In a further advantageous embodiment it is proposed a method wherein the active base node is triggered to transmit the first indication, provided the new base node is situated in proximity of the active base node, and wherein the triggering is initiated by one out of:
 the core network,
 the new base node, and/or
 a wireless device not supporting the first mode of operation after detecting the new base node during regular measurements of transmissions of base nodes.

With this embodiment a couple of different advantageous triggers are identified for the first indication from the active base node to wireless devices camping on the active base node, in particular those supporting the first mode of operation.

Within the first option the core network informs the active base node about the new base node in proximity. This is possible as the new base node needs to register at the core network, and the core network has with the S1 interface direct access to all other neighbour nodes.

Alternatively or additionally the new base node preferably triggers the indication, either directly once the X2 interfaces are setup, or via the core network.

Alternatively or additionally a wireless device which is not supporting the first mode is triggering the indication. This affects mobile devices, which have not switched off the regular base node measurements. Hence such mobile devices detect newly added base nodes and are able to report this to the active base node, which then effects the first indication. As a result it is made use of the high-mobility wireless devices for triggering reliable measurements.

Wireless devices supporting the first mode, that is in particular low-mobility devices, are advantageously also configured to execute base node measurements prior to a scheduled data transmission. This is preferably to assure that the scheduled data transmission will be successful, and as side effect the wireless device is able to figure out if new base nodes nearby where activated. In this case the wireless device preferably transmits an indication to its active base node, which then effects the first indication. A combination of these options is also foreseen as part of this embodiment.

It is in particular determined based on the tracking area If a new base node is in proximity to the active base node. If both are in the same tracking area, then they are expected to be in proximity.

Alternatively geographical co-ordinates—provided in particular by GPS or cell-location-methods—even in rough resolution are preferably used to identify a bee-line distance and determine if two base nodes are within a threshold distance or not.

In a further advantageous embodiment it is proposed a method further comprising the step for the wireless device of:
switching back to first mode of operation under the condition that
 the at least one measurement report is transmitted to the active base node, and/or
 after execution of a predetermined amount and/or period of measurements of transmissions of base node without determining transmissions from the new base node, and/or
 the wireless device conducted a reselection.

This embodiment describes the process of switching back from the second mode to the first mode of operation for the wireless devices supporting the first mode. With this embodiment it is defined under what circumstances the switchback is carried out.

According to the first option, the switchback to the first mode is directly executed after submitting the measurement report to the by then active base node. This is an unconditional process and assures that each affected wireless device sends exactly once after the receiving the indication from the base node the measurement reports. This option assures that at least one measurement is carried out and reported.

Alternatively the wireless device proceeds in the second mode for a predetermined period of time or an amount of measurements.

Finally it is preferable to switch back to the first mode after the wireless device executed a reselection to another base node, in particular the new base node.

Introduction of one of these options is advantageous in order to assure that generally the wireless devices supporting the first mode of operation returns safe and sound to the first mode of operation which is generally expected and foreseen as boundary conditions for their operation.

According to the second aspect of the invention it is proposed a wireless device operating in a cellular network comprising a plurality of base nodes, the cellular network further providing self organizing network capabilities, wherein the wireless device is configured to operate with an active base node, which is the base node, the wireless device is currently camping on, the wireless device is further configured to operate in a first mode, comprising, that measurements of transmissions of base nodes are diminished, wherein the wireless device is further configured, upon reception of a first indication, to switch to a second mode of operation, comprising execution of at least one measurement of transmissions of base nodes different from the active base node, and to transmit at least one measurement report to the by then active base node, wherein the measurement report contains results of said measurement and a base node reference of the measured base node.

The second aspect shares the advantages of the first aspect.

According to an advantageous embodiment of this aspect it is proposed the wireless device is further configured to switch to the second mode of operation in conjunction with a data transmission from the wireless device to a remote device via the cellular network.

This embodiment is advantageous as it allows for the respective wireless device to independently switch from the first mode to the second mode in response to a scheduled data transmission. This is advantageous as the majority of the wireless devices supporting the first mode of operation at one point in time will wake up and preferably execute a measurement of neighbour base nodes in order to assure the successful data transmission. Preferably the wireless device as part of this exercise provides measurement reports to the active base node, and thus is able to indicate the appearance of a new base node, and—if applicable—moreover execute a reselection to the new base node.

In another preferred embodiment the wireless device is configured to register at the serving cellular network as wireless device supporting the first and second mode.

By means of this indication the base node, and in effect the cellular network, is aware of which wireless devices supporting the first mode of operation are currently registered. This affects in particular MTC devices.

The information is in particular provided by an assignment to the M2M domain. Further subgrouping, e.g. about power supply or battery status is preferably further part of this indication.

This option is advantageous as based on such indication the base node is put in the position to selectively activate by the first indication wireless devices belonging to the M2M domain or a subdomain, and moreover leave others out, which have a critical power situation.

According to a third aspect of the invention it is proposed a base node, being part of a cellular network comprising a core network and a plurality of base nodes, the cellular network further providing self organizing network capabilities, the base node is configured to communicate with at least one wireless device, that is camping on the base node, the wireless device being configured to operate in a first mode, comprising, that measurements of transmissions of base nodes are diminished, the base node is further configured to maintain neighbour relation data, further configured to:
  in case the cellular network is enhanced by a new base node, receive a trigger event concerning the enhancement of the cellular network,
  in response to the reception transmit a first indication to the at least one wireless device,
  receive from the wireless device at least one measurement report containing results of measurements of transmissions of base nodes by the wireless device, and a base node reference of the measured base node,
  update neighbour relation data relating to the base node identified by said base node reference with information obtained from the received measurement report.

The third aspect shares the advantages of the first aspect.

According to a preferred embodiment it is proposed a base node further configured to transmit the first indication as part of a broadcast channel element.

In particular it is proposed that the first indication is transmitted as part of the broadcast channel element in conjunction with a data element, which indicates that said broadcast channel element is dedicated for wireless devices supporting said first and second mode of operation.

The respective base node is generally configured to provide a broadcast channel, which is expected to be read regularly or occasionally by wireless devices camping on the respective base node. Hence it is advantageous to provide the indication as part of the broadcast channel. This saves introduction of other types of telegrams or a blocking of dedicated channels, in particular as the broadcasting is typically done cyclic.

Preferably a broadcast channel dedicated for the wireless devices supporting the first mode, in particular MTC devices, is used for broadcasting the first indication. This is preferably done by an extra transmitted element with the broadcast channel, in particular a corresponding MTC-SYS-RNTI, indicating broadcast messages for MTC devices only.

According to another preferred embodiment of this aspect it is proposed a base node further configured to transmit upon reception of the at least one measurement report a second indication to at least one other base node informing about reselection of at least one wireless device supporting said first and second mode towards said transmitting base node.

According to this embodiment it is in particular advantageous when the receiving base node, when it first gets notice of a new base node in proximity transmits a message to the new base node in order to setup a X2 interface between both. It further indicates to the other base node that a wireless device supporting the first mode has performed a reselection to the now active base node.

In particular for the case that the wireless device transmits with the measurement report an indication of the cause for the measurement report it is advantageous for the base node to decide about such second indication to at least one other base node.

In effect these embodiments of the invention help the base nodes of the cellular network to perform its self organizing task accordingly and with a help of the reliable measurement received from wireless devices supporting the first mode, in particular those which are basically stationary.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

Figure 1:
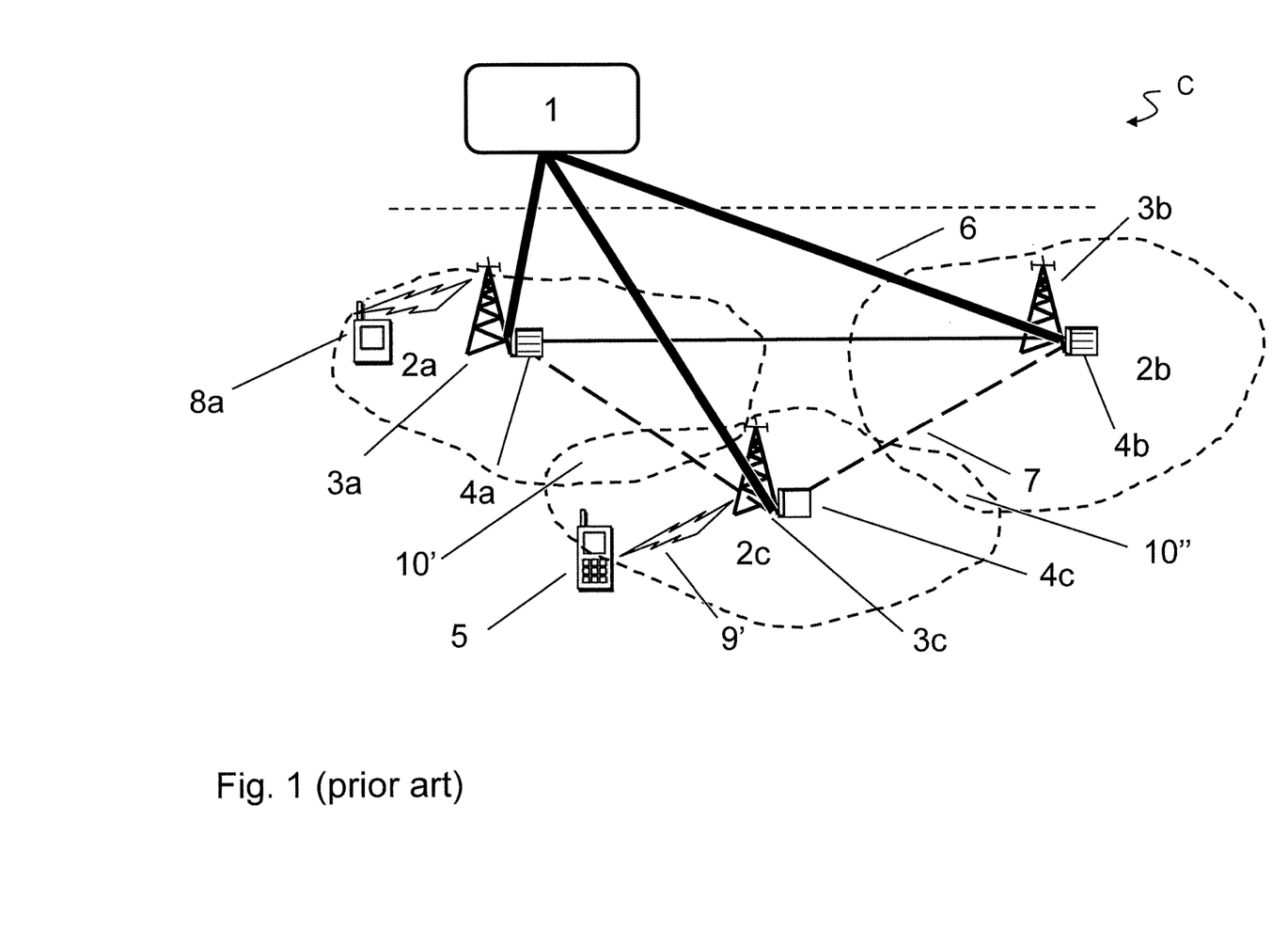
FIG. 1 represents an excerpt of a cellular network with base nodes and a wireless device according to the prior art.

FIG. 1 schematically shows the situation of a cellular network C with self organising network capability according to the prior art.

The cellular network C is in particular a cellular network supporting long term evolution (LTE) standard, also known as a 4G-network. Typically the same cellular network comprises various radio access networks (RAN), like 2G, 3G and 4G and its respective wireless technology standards (GSM, EDGE, UMTS, HSDPA etc.), where a base node is assigned to one RAN. However at the same location, in particular in combined housings, preferably more than one base node each supporting different RANs are supported.

For simplicity reasons it is assumed in the following that each base node $3a$-$c$ is supporting one RAN. Further each base node $3a$-$c$ populates one respective cell area $2a$-$c$.

Base nodes in LTE are known as eNodeBs resp. nodeB. The naming is used in the following equivalently.

The cellular network C further comprises a core network 1, which is the central control entity of the cellular network. The core network and the base nodes are connected via an interface link called S1-interface 6. This S1-interface 6 is usually a wired connection where the base nodes $3a$-$c$ exchange both control information with the core network 1 and payload of the established connections to the wireless devices operating with the base nodes $3a$-$c$.

In the current situation two types of wireless devices are shown in proximity of the respective base nodes $3a$-$c$. The first is a mobile handset 5. This is camping on base node $3c$, the camping relationship is indicated with lightning 9'.

According to the standard a mobile handset 5 regularly scans for available base nodes in the proximity, including the one it is camping on. The results of these measurements are provided to the currently active base node $3c$. With that a moving mobile handset notices additionally installed base nodes, and would even be able to execute a reselection to a base node, including newly installed base nodes, should the signalling conditions be remarkably better than with the currently active base node.

On the other hand there is shown a low-mobility device $8a$. This one is typically fixed at its location, e.g. in hard connection with an electricity metering device, a vending machine or a parking meter. It is camping on base node $3a$.

For such devices regular measurements of neighbour base nodes are a waste of resources, in particular when the energy supply is critical, e.g. when it is run with normal batteries. Due to that it is known that those low-mobility devices preferably are operated in an energy efficient mode, wherein the measurements of transmissions from base nodes are diminished. This means in particular that in the normal operation no base node measurements are executed and reported, and only in case of certain events, externally or internally triggered, these measurements are executed.

Hence, the low-mobility device $8a$ is camping on base node $3a$, and would not recognize for the moment if a new base node would be introduced in sight of the device.

Further the base nodes $3a$-$c$ are additionally configured to establish X2 interface 7 interconnecting the base nodes in a neighbouring area. This is to relief the core network from tasks in conjunction with its base nodes. In particular for handover operations the affected base nodes are able to connect each other directly, without material involvement of the core network. When a new base node is introduced in the field, the X2 interface is not really set up, as the previously existing base nodes do not notice the newly installed base node in the first place. In this figure this is indicated as new base node $3c$ is introduced and the X2 interface lines 7 are shown dashed—that means the X2 interface to base node $3a$ and $3b$ are only expected to be setup.

Each base node $3a$-$c$ maintains a neighbour relation table $4a$-$c$ which holds information about neighbour base nodes, in particular its identifiers and information relating to the X2 interface. For base node $3c$ this neighbour relation table $4c$ is empty in the first place.

When a mobile handset 5 has moved into the cell area $2c$, it will notice through its measurements that the new base node $3c$ provides better signalling conditions and will make a reselection to base node $3c$.

When the mobile handset 5 then moves to overlapping area 10' or 10" it will detect both strong signals from the active base node $3c$ and from the neighbour base node $3a$ resp. $3b$. These measurements are reported as part of the RRC reports to the active base node $3c$. The active base node in response takes the information included in the received measurement reports and creates entries for its neighbour relation table $4c$.

What the base node does not know is the velocity of the mobile handset—is it a pedestrian standing on a sidewalk or is it placed in a car. Consequently the location of the mobile handset 5 when the measurements were made might be different from the location when the measurements are reported. Further repetitive measurements will most probably provide different results. This is for the base node disadvantageous. Further there are areas possible where no mobile handsets 5 are regularly expected but a plurality of fixed devices, e.g. sensoring devices etc. are installed.

Hence it would prefer if a static device like the low-mobility device $8a$ would provide such measurements. But even if the low-mobility device $8a$ would be situated in the overlapping region 10', it would in normal operation neither execute measurements of signals from the new base node $3c$ and provide it to its active base node $3a$, nor it would execute a reselection to the new base node $3c$. Consequently neither base node $3a$ nor the new base node $3c$ retrieve measurement reports from the low-mobility device $8a$ concerning each other, as long as the low-mobility device $8a$ is operating in the energy efficient mode.

Figure 2:
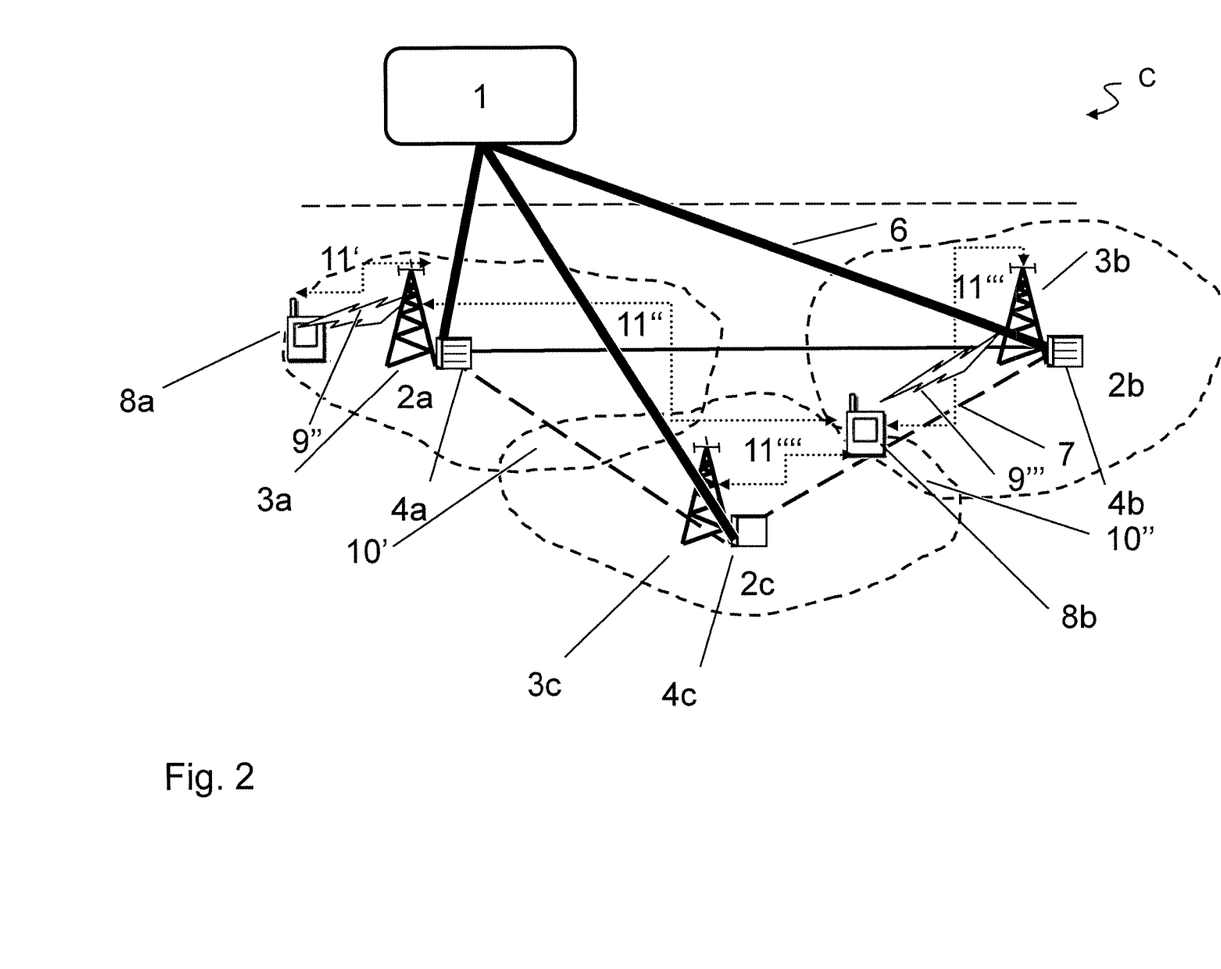
FIG. 2 represents an excerpt of a cellular device with base nodes and wireless devices according to an embodiment of the invention.

FIG. 2 shows for the same setup the situation when a preferred embodiment of the invention is implemented. It is shown again the cellular network C with the core network 1 and the base nodes $3a$-$c$, populating cell areas $2a$-$c$. Base node $3c$ is newly introduced, hence its neighbour relation table $4c$ is empty and the X2 interfaces to the base nodes $3a$ and $3b$ are not setup.

It is for the shown situation assumed that no mobile handsets 5 are currently available but the low-mobility devices $8a$ and $8b$. Low-mobility device $8a$ is in a camping relationship 9" with base node $3a$, situated in cell area $2a$. Low-mobility device $8b$ is camping on base node $2b$, but it is situated in the overlapping area 10" of the cell areas $2b$ and $2c$.

That means, the low-mobility device $8b$ would—should it execute measurements of transmissions from base nodes— receive measurable transmissions both from base node $2b$ and $2c$.

According to a preferred embodiment of the invention, upon installation of the new base node $3c$, the core network 1—which anyhow needs to know about newly introduced base nodes—informs via the S1 interface 6 the base nodes $3a$ and $3b$ which are located in the tracking area of the new base node $3c$. Base nodes $3a$ and $3b$ in response inform all wireless devices—irrespective if mobile or low-mobility— about the new introduced base node $3c$.

This triggers for the low-mobility devices 8a, 8b to switch to the second mode of operation and hence conduct base node measurements. Low-mobility device 8a detects during these measurements only measurable transmissions 11' from base node 3a, which is its active base node. Depending on the implementation this information or a measurement report is provided to the active base node 3a. For the neighbour relation table 4a this information includes no valuable information which would need a modification of the neighbour relation table 4a. Preferably the low-mobility device 8a is configured that way, that measurements concerning the active base node are not submitted with measurement reports. This is in particular advantageous when the measurements show no difference to previously transmitted measurement reports.

In contrast low-mobility device 8b executes measurements concerning measurable transmissions 11", 11'" and 11"" from the base nodes 3a-c. Based on these measurements the base node is configured to provide measurement reports to the active base node. For base node 3a the low-mobility device 8b will merely detect the availability, at least it shows that the received signal strength is not sufficient for camping on that base node. Should low-mobility device 8b detect during these measurements that the signal strength from base node 3c are favourable compared to those from the active base node 3b, it is preferred that the low-mobility device 8b first executes a reselection, which is an operation resulting in a change of the active base node from the previously active base node 3b to the new base node 3c.

Once this reselection is done, the low-mobility device 8b transmits its measurement reports to the new base node 3c. With these measurement reports, the new base node 3c is able to add first entries to its neighbour relation table 4c, and additionally to establish a new X2 interface 6 to the neighbour base nodes 3a and 3c.

Figure 3:
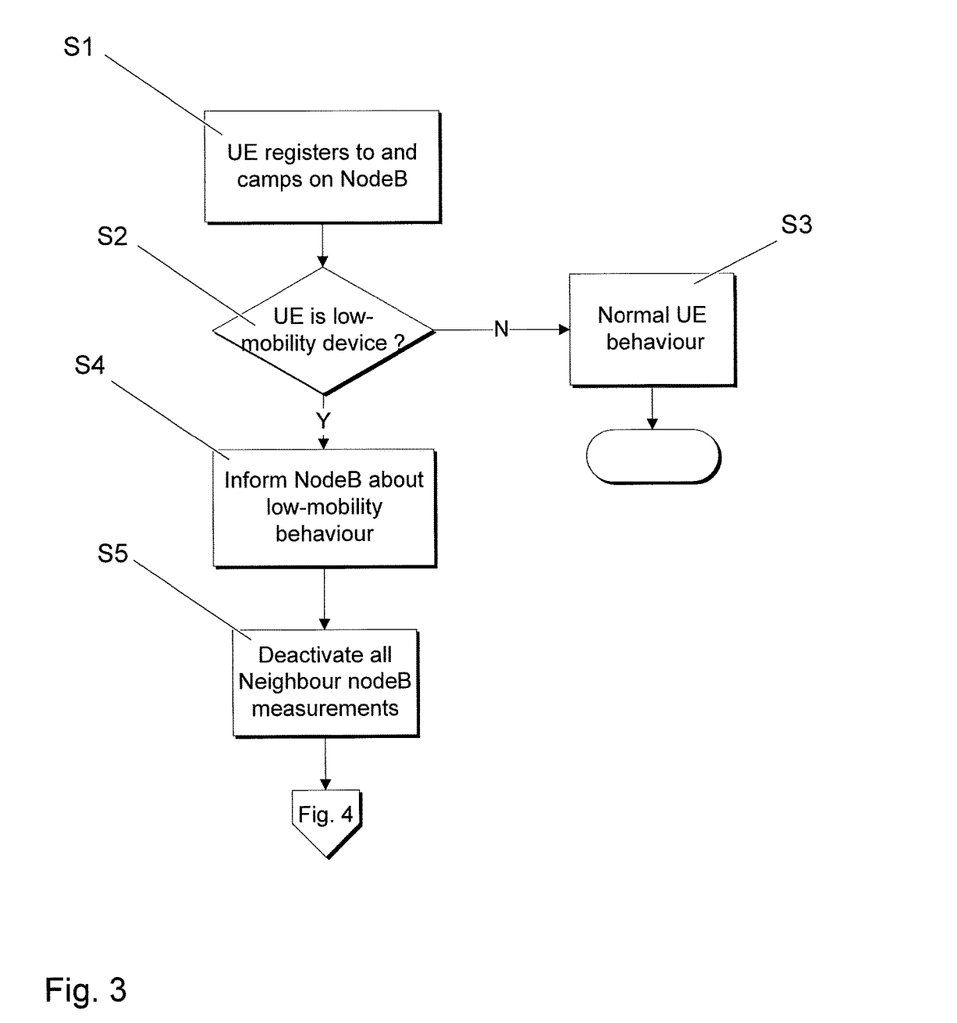
FIG. 3 shows a flow chart showing the initial part of the process flow according to a preferred embodiment of the invention.
Figure 4:
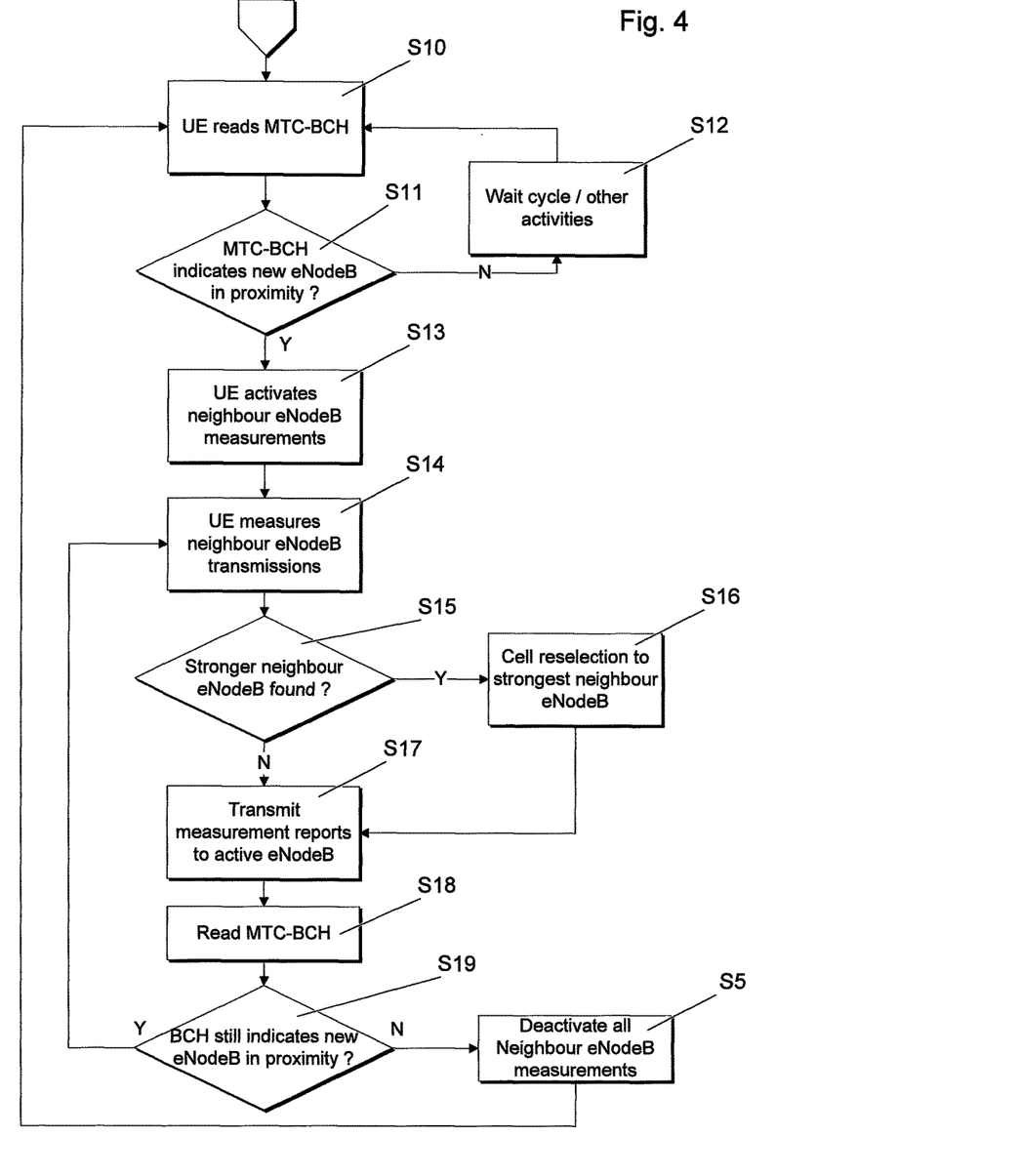
FIG. 4 shows the second part of the process flow according to a preferred embodiment of the invention.

An embodiment of the proposed process flow for the low-mobility devices is shown in more detail in FIGS. 3 and 4. The process starts in FIG. 3 with the low-mobility device, in the following named as user equipment (UE), which registers in step S1 at the base node resp. eNodeB. As a result, the UE is camping on the base node, that means the respective base node is the active base node of the UE.

As part of the registration process or afterwards it is then checked in decision step S2, if the UE is a low-mobility device. This information is either provided by the UE during registration, or it is an information available in the cellular network, e.g. the home location register (HLR), or as part of an assignment to a M2M-Domain, covering machine type equipment.

The tag "low-mobility-device" in particular comprises also that the UE is capable of operating in the energy efficient mode, that means with diminished measurements of neighbour base nodes.

If in the decision step is detected, that the UE is no low-mobility device, then the process branches to step S3, and the UE is operating as a normal mobile handset, the special handling therefore terminates here.

If the UE turns out to be a low-mobility device, then in step S4 this information is provided to the eNodeB and in the next step S5 the energy efficient mode is activated. It is arbitrary in which order these steps are executed.

By now the normal registration procedure of a low-mobility device capable of supporting the energy efficient mode is described, as it is known from the prior art.

The process then jumps to the first step of FIG. 4, where the handling of a newly introduced eNodeB is shown from the perspective of the UE.

It starts in step S10 with the operation that the UE reads the MTC-BCH. The BCH is a broadcast channel within LTE, which informs the UEs camping on a eNodeB about certain events and other information. In the preferred embodiment of the invention it is foreseen a BCH which is reserved for machine-type communication devices, or in other words M2M devices. The LTE standard comprises a special handling for these devices which in many ways differ from mobile handsets used by humans, and therefore assign certain channels for such devices exclusively. In particular this is done by a corresponding MTC-SYS-RNTI, indicating BCH messages for MTC devices only. Thus the MTC devices know that they are expected to decide such broadcast messages while other devices do not read it.

Camping UEs regularly read the BCH feed, in particular directly before executing a transmission, after registration etc.

In step S11 the read information are analysed and in particular checked if an indication is transmitted with the MTC-BCH concerning a newly introduced eNodeB in proximity of the UE. This is in particular the case when the new eNodeB is positioned in the same tracking area than the currently active base node. As described for FIG. 2 it is in particular advantageous if the core network 1 reports via the S1 interface to all eNodeBs of the same tracking area, that the new eNodeB is installed, up and running, and in response the informed eNodeBs send this information via the MTC-BCH to all UEs which are currently camping on the respective eNodeBs.

If the MTC-BCH comprised no such indication, the process flow branches to step S12 and consequently back to step S11. This cycle is basically the normal handling of the UE with waiting cycle or other activities which are not elaborated on as part of this invention.

In case the MTC-BCH indicates a newly introduced base node, then in step S13 the UE reacts and activates the neighbour eNodeB measurements. Preferably this means that the energy efficient mode is left, and a second mode, which is preferably quite similar to the operating mode of a high-mobility device like a mobile handset, is activated.

As part of this mode, in S14 then the UE starts to perform measurements of signalling transmissions from detectable eNodeBs. As it is the case for the normal reselection process, the results of this measurement exercise is a table of detected eNodeBs, in particular comprising eNodeB identifications and at least one key value indicating the detectable radio signal strength of this eNodeB. The base node identification is any information that is suitable for distinctly identifying the eNodeB, at least within the tracking area. This is in particular a Cell-ID, a supported frequency or scrambling code (PSC).

When ordering the table of detected eNodeBs by the signal strength key value, it turns out which eNodeB has the highest signal strength for the UE. As the UE is a low-mobility device, this situation is expected to be unchanged, as long as the UE is not moved anyway or a new eNodeB is introduced or an existing eNodeB is switched off.

Hence in step S15 it is checked if the now strongest eNodeB is still the active eNodeB. If not, then the UE executes a cell reselection to the strongest neighbour eNodeB in step S16. This is in particular the case when the new eNodeB is positioned closer to the UE than the by then active eNodeB is situated. Hysteresis mechanisms and/or threshold values, which compensate the energy to be invested in a reselection are preferably also taken into account.

With or without the reselection step, in step S17 then the UE transmits measurement reports based on the measurements from step S14 to the then active eNodeB.

On the side of the active eNodeB the measurement report is thus received and in particular compared to its neighbour relation table. If any reported information is not yet available in the neighbour relation table it would then be added there. This means in particular for the newly added eNodeB, that here probably the first indications of neighbour base nodes are added. For the other eNodeBs the measurement report might include the first indications about the newly added eNodeB. Preferably the update of the neighbour relation table further comprises a confidentiality value indicating that the measurement report was received by a low-mobility device.

As a result of any of that, it is in particular advantageous when the receiving eNodeB, when it first gets notice of a new eNodeB in proximity transmits a message to the new eNodeB in order to setup a X2 interface. It further indicates to the other eNodeB that a low-mobility UE has performed a reselection to the now active base node. Generally the X2 interface is known as a kind of virtual connection, which physically is routed via the wired connection to and from the core network. The physical implementation of the X2 interface is transparent for this invention.

After sending the measurement report the UE then checks again in step S18 the MTC-BCH and then decides in step S19 if the BCH still indicates a new eNodeB in proximity. In another preferred embodiment step S18 and S19 are executed prior to step S17, that is if the transmissions of the prepared measurement report is actually conducted is depending upon the fact that still the MTC-BCH indicates the new eNodeB in proximity. With that setup it is achieved that as soon as all neighbour relation information are up to date in the legacy eNodeBs and the new eNodeB, no measurement reports are required from the low-mobility devices. This saves signalling load in the cellular network and energy at the low-mobility device.

If the MTC-BCH still indicates the new eNodeB in proximity, then the process flow returns to step S14. Otherwise the process flow returns to step S5 (also in FIG. 3), which means that the UE returns to the energy efficient mode and switches off neighbour eNodeB measurements.

With the exemplifying embodiments of the invention shown in the figures it becomes clear, that the self organizing network feature gets well enhanced by the proposed embodiments in order to have the cellular network take advantage of measurements from the low-mobility devices.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention.

REFERENCE SIGNS

C Cellular network
1 Core network
2a-c Cell areas a-c
3a-c Base node a-c
4a-c Neighbour relation tables of base nodes a-c
5 Mobile handset (high mobility wireless device)
6 S1 interface (base node—core network)
7 X2 interface (between base nodes)
8a,b Low-mobility devices
9',9" Camping relationship wireless device—active base node
10', 10", 10'" Measurable transmissions from not active base nodes to wireless device

The invention claimed is:

1. Method for operating a low-mobility wireless device in a cellular network, the cellular network comprising a core network and a plurality of base nodes, each configured to maintain neighbour relation data, the cellular network further providing self organizing network capabilities,
wherein the low-mobility wireless device is operating with an active base node, which is the one of said base nodes the low-mobility wireless device is currently camping on, and the low-mobility wireless device is operating in a first mode, comprising that measurements of transmissions of base nodes are diminished,
the method comprising the steps of, for the cellular network:
in case the cellular network is enhanced by a new base node, triggering the active base node to transmit a first indication at least to said low-mobility wireless device,
for the low-mobility wireless device, in response to the reception of the first indication, switching to a second mode of operation, comprising execution of at least one measurement of transmissions of base nodes, and
transmitting at least one measurement report to the by then active base node, the measurement report comprises results of said measurements and a base node reference of the measured base nodes,
for the active base node, upon reception of a measurement report, updating neighbour relation data relating to the base node identified by said base node reference with information obtained from the received measurement report.

2. Method according to claim 1,
comprising for the low-mobility wireless device the step of executing an operation resulting in one of the measured base nodes becoming the active base node, prior to transmitting the measurement report.

3. Method according to claim 1,
wherein the measurement report further comprises an element indicating a cause of the measurement report relating to the triggering of said measurement through said first indication.

4. Method according to claim 1,
wherein the active base node is triggered to transmit the first indication, provided the new base node is situated in proximity of the active base node,
and wherein the triggering is initiated by one out of:
the core network,
the new base node, and/or a moving wireless device not supporting the first mode of operation after detecting the new base node during regular measurements of transmissions of base nodes.

5. Method according to claim 1,
wherein the first indication is part of a broadcast channel element transmitted from the triggered active base node to at least one wireless device.

6. Method according to claim 1,
further comprising the step for the low-mobility wireless device of:
switching back to first mode of operation under the condition that
the at least one measurement report is transmitted to the active base node, and/or
after execution of a predetermined amount and/or period of measurements of transmissions of base node without determining transmissions from the new base node, and/or
the low-mobility wireless device conducted a reselection.

7. Low-mobility wireless device operating in a cellular network comprising a plurality of base nodes, the cellular network further providing self organizing network capabilities,
wherein the low-mobility wireless device is configured to operate with an active base node, which is the base node, the low-mobility wireless device is currently camping on,
the low-mobility wireless device is further configured to operate in a first mode, comprising, that measurements of transmissions of base nodes are diminished,
wherein the low-mobility wireless device is further configured, upon reception of a first indication, to switch to a second mode of operation, comprising execution of at least one measurement of transmissions of base nodes different from the active base node, and
to transmit at least one measurement report to the by then active base node, wherein the measurement report contains results of said measurement and a base node reference of the measured base node.

8. Low-mobility wireless device according to claim 7,
further configured to execute prior to transmitting the measurement report an operation resulting in one of the measured base nodes becoming the active base node.

9. Low-mobility wireless device according to claim 7,
further configured to switch back to the first mode of operation under the condition that
a) the at least one measurement report is transmitted to the active base node, and/or
b) execution of a predetermined amount and/or period of measurements of transmissions of base nodes without determining transmissions from the new base node, and/or
c) the low-mobility wireless device conducted a reselection to the new base node.

10. Low-mobility wireless device according to claim 7,
further configured to switch to the second mode of operation in conjunction with a data transmission from the low-mobility wireless device to a remote device via the cellular network.

11. Low-mobility wireless device according to claim 7,
wherein the low-mobility wireless device is configured to register at the serving cellular network as wireless device supporting the first and second mode.

12. Low mobility wireless device according to claim 7,
wherein execution of at least one measurement of transmissions further comprises measurements of transmissions from the active base node.

13. Base node, being part of a cellular network comprising a core network and a plurality of base nodes, the cellular network further providing self organizing network capabilities,
the base node is configured to communicate with at least one low-mobility wireless device, that is camping on the base node, the wireless device being configured to operate in a first mode, comprising, that measurements of transmissions of base nodes are diminished,
the base node is further configured to maintain neighbour relation data,
further configured to:
in case the cellular network is enhanced by a new base node, receive a trigger event concerning the enhancement of the cellular network,
in response to the reception transmit a first indication to the at least one low-mobility wireless device,
receive from the low-mobility wireless device at least one measurement report containing results of measurements of transmissions of base nodes by the wireless device, and a base node reference of the measured base node,
update neighbour relation data relating to the base node identified by said base node reference with information obtained from the received measurement report.

14. Base node according to claim 13,
wherein the triggering event is received from one out of:
the core network,
the new base node, and/or
a moving wireless device not supporting the first mode of operation after detecting the new base node during regular measurements of transmissions of base nodes.

15. Base node according to claim 13,
further configured to transmit the first indication as part of a broadcast channel element.

16. Base node according to claim 15,
wherein the first indication is transmitted as part of the broadcast channel element in conjunction with a data element, which indicates that said broadcast channel element is dedicated for low-mobility wireless devices supporting said first and second mode of operation.

17. Base node according to claim 13,
further configured to transmit upon reception of the at least one measurement report a second indication to at least one other base node informing about reselection of at least one low-mobility wireless device supporting said first and second mode towards said transmitting base node.

* * * * *